(12) United States Patent
Kamibayashiyama

(10) Patent No.: US 9,383,036 B2
(45) Date of Patent: Jul. 5, 2016

(54) BONDED SLIT VALVE DOOR SEAL WITH THIN NON-METALLIC FILM GAP CONTROL BUMPER

(75) Inventor: Julian Kamibayashiyama, San Diego, CA (US)

(73) Assignee: Parker-Hannifin Corporation, Cleveland, OH (US)

( * ) Notice: Subject to any disclaimer, the term of this patent is extended or adjusted under 35 U.S.C. 154(b) by 1630 days.

(21) Appl. No.: 12/189,251

(22) Filed: Aug. 11, 2008

(65) Prior Publication Data

US 2009/0045371 A1 Feb. 19, 2009

Related U.S. Application Data

(60) Provisional application No. 60/955,672, filed on Aug. 14, 2007, provisional application No. 60/955,891, filed on Aug. 15, 2007, provisional application No. 61/029,436, filed on Feb. 18, 2008.

(51) Int. Cl.
| | |
|---|---|
| *F16K 25/00* | (2006.01) |
| *F16K 31/44* | (2006.01) |
| *F16K 51/02* | (2006.01) |
| *F16K 3/02* | (2006.01) |
| *F16K 3/16* | (2006.01) |

(52) U.S. Cl.
CPC ............... *F16K 51/02* (2013.01); *F16K 3/0227* (2013.01); *F16K 3/16* (2013.01)

(58) Field of Classification Search
CPC .......... F16K 51/02; F16K 1/46; F16K 3/0227
USPC ................... 251/326, 328, 333, 334, 170, 931
See application file for complete search history.

(56) References Cited

U.S. PATENT DOCUMENTS

| | | | |
|---|---|---|---|
| 3,130,952 A | 4/1964 | Meyer | |
| 3,746,304 A | 7/1973 | Matthias | |
| 4,492,362 A | 1/1985 | Garcia, Jr. et al. | |
| 4,809,950 A | 3/1989 | Geiser | |
| 4,881,717 A | 11/1989 | Geiser | |
| 5,163,655 A * | 11/1992 | Chickering et al. | .......... 251/174 |
| 5,226,632 A | 7/1993 | Tepman et al. | |
| 5,579,718 A | 12/1996 | Freerks | |
| 6,089,543 A | 7/2000 | Freerks | |
| 6,231,290 B1 | 5/2001 | Kikuchi et al. | |

(Continued)

FOREIGN PATENT DOCUMENTS

| | | |
|---|---|---|
| JP | 10-132095 | 5/1998 |
| JP | 2004-211727 | 7/2004 |

OTHER PUBLICATIONS

English translation of Office Action in corresponding Korean Patent Application No. 2008-0080086 dated Jan. 27, 2015.

*Primary Examiner* — John K Fristoe, Jr.
*Assistant Examiner* — Hailey K Do
(74) *Attorney, Agent, or Firm* — Renner, Otto, Boisselle & Sklar, LLP

(57) ABSTRACT

The present invention provides a thin film spacer for maintaining a gap between a slit valve door and a sealing surface of a slit valve, such as a metallic insert. The film spacer can extend the life of a seal by limiting the line of sight exposure of the seal to corrosive gases within a wafer processing chamber, for example, and by controlling the compression percentage of the seal. The spacer may be located on an outer ambient side of the slit valve away from any corrosive gasses that may exist in the chamber.

22 Claims, 11 Drawing Sheets

(56) References Cited

U.S. PATENT DOCUMENTS

| | | |
|---|---|---|
| 6,629,682 B2 | 10/2003 | Duelli |
| 6,685,163 B2 | 2/2004 | Blecha |
| 6,837,483 B2 * | 1/2005 | Wu .............................. 251/328 |
| 7,011,294 B1 | 3/2006 | Ehrne et al. |
| 7,159,846 B2 | 1/2007 | Aggarwal et al. |
| 7,527,706 B2 | 5/2009 | Morita |
| 2008/0315141 A1 * | 12/2008 | Thrash .................... F16K 51/02 251/170 |

* cited by examiner

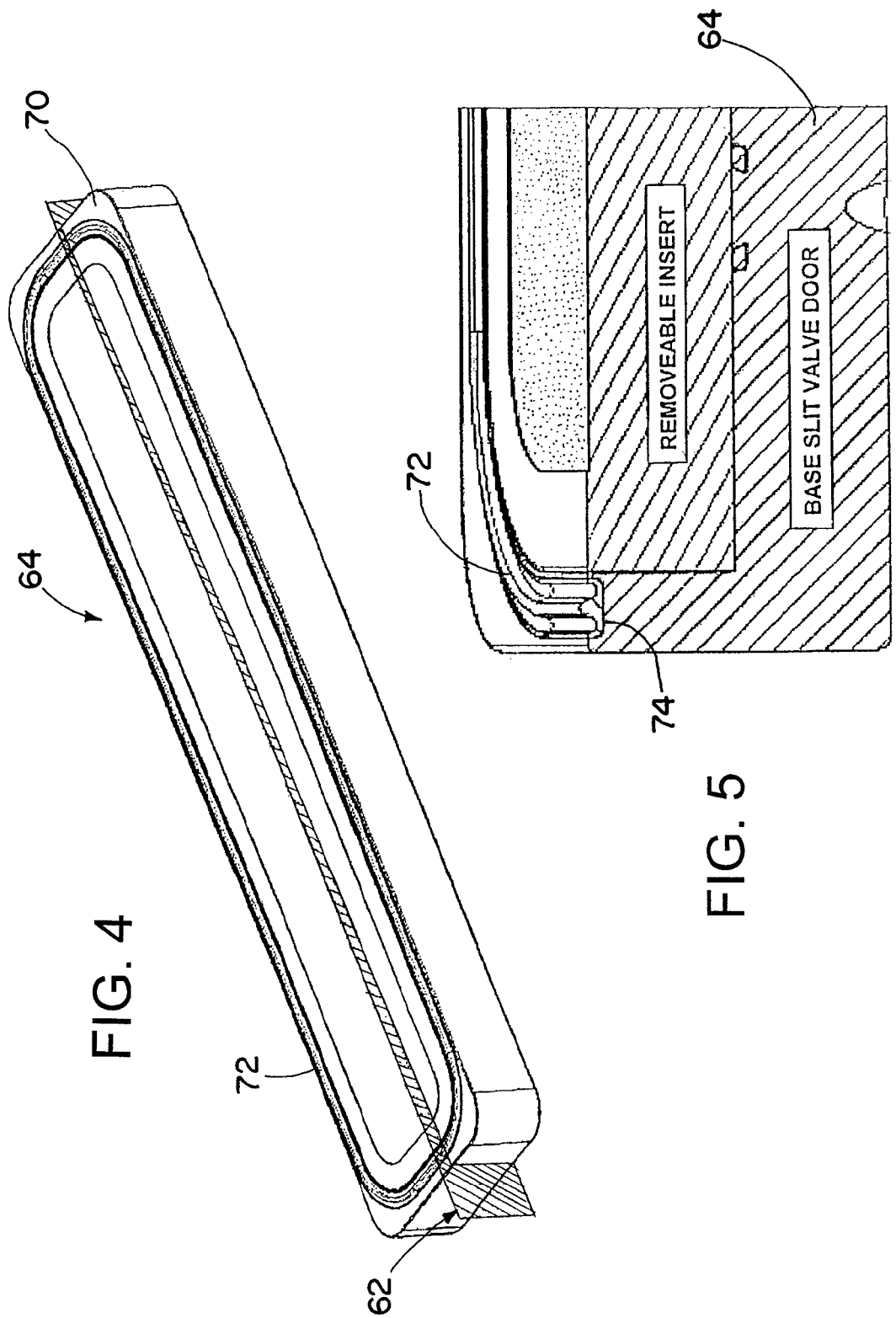

BONDED SLIT VALVE DOOR SEAL WITH THIN NON-METALLIC FILM GAP CONTROL BUMPER

RELATED APPLICATIONS

This application claims the benefit of U.S. Provisional Application Nos. 60/955,891 filed Aug. 15, 2007, and 60/955,672 filed Aug. 14, 2007, and 61/029,436 filed Feb. 18, 2008, all of which are hereby incorporated herein by reference.

FIELD OF THE INVENTION

The present invention relates generally to seal assemblies for valves and more particularly to slit valve door seal assemblies having particular use in forming a seal between chambers in vacuum equipment employed in the semiconductor industry for chip manufacture.

BACKGROUND OF THE INVENTION

Vacuum systems for manufacturing integrated circuits on wafers are generally known. A vacuum processing system may typically have a centralized vacuum chamber, called a transfer chamber, which may be part of a mainframe, for transferring wafers from one process chamber or load lock chamber to the next. A vacuum processing system may also typically have some kind of subsystem, such as a mini-environment, for providing the wafers to the load locks and other chambers and for collecting them back in order to send them on to the next system for processing. This transfer chamber plus the peripheral chambers and staging areas are sometimes called a cluster tool.

Between two vacuum chambers, such as the transfer chamber and one of the process chambers, is a slit valve. The slit valve includes an elongated rectangular opening for providing physical access between the two vacuum chambers. For example, when the slit valve is open, a robot in the transfer chamber may retrieve a wafer from one vacuum chamber and insert it into another vacuum chamber using a long, thin blade to hold the wafer.

After the wafer has been inserted into a vacuum chamber, the slit valve may be closed and sealed with a slit valve door by, for example, a pneumatic actuator. The slit valve door usually forms an airtight seal for the slit valve so that the pressure differential between the two chambers will not cause a gas leak through the slit valve. A metal insert may be placed within the slit valve opening in order to form a better airtight seat for the slit valve door.

Slit valve doors have typically been made of metal. The metal-to-metal contact between a slit valve door and the metal insert may provide a very good seal, but metal-to-metal contact may create microscopic particles that scrape off of the metal and get into the otherwise relatively clean environment of the vacuum chambers. Such particles may land on the wafers in the chambers, thereby contaminating them. Such contamination is undesirable in the processing of wafers.

To reduce the contamination by particles from the slit valve, an O-ring has typically been placed in a groove in the slit valve door. Thus, metal-to-metal contact is avoided, so no particles are thereby generated, and the O-ring can provide a satisfactory seal for the slit valve in many applications.

However, since the seal between the O-ring and the slit valve is not static, but rather is constantly being opened and closed such that there is rubbing and abrading on the O-ring from the slit valve insert, some particle generation, typically from the O-ring, still may occur.

U.S. Pat. No. 6,089,543 discloses a two piece slit valve door comprising a seal plate mounted on a mounting member. The seal plate, which actually contacts the slit valve, has a molded-in-place seal for making the contact and preventing metal-to-metal contact between the door and the valve. The seal may have a parabolic profile and may be adhesively bonded within a groove in the seal plate.

Another consideration when utilizing a resilient seal is controlling the size of the gap between the door and chamber to eliminate dynamic metal-to-metal scrubbing of the door and slit valve and/or overcompression of the seal. Controlling the size of this gap can also protect the seal from excessive exposure to the harsh chemicals that may exist in the chamber. Typically, controlling the gap size has involved tedious adjustment of the door and/or calibration of the actuator.

Traditional slit valve doors utilizing a resilient seal, such as a vulcanized fluorocarbon seal or a perfluorinated o-ring, typically have relied on the clean dry air (CDA) pressure setting of the slit valve pneumatic actuator to control the size of the gap between the door and valve and, thus, the seal compression. Fatiguing of the o-ring or vulcanized seal through dynamic cycling of the slit valve door can result in plastic deformation of the elastomer which leads to inconsistent gapping between the slit valve door and the slit valve (and/or insert). Inconsistent gapping can result in seal overcompression, metal-to-metal contact between the slit valve door and the slit valve, high exposure levels of the sealing element to corrosive process gases, and premature degradation of the seal.

SUMMARY OF THE INVENTION

The present invention provides a thin film spacer for maintaining a gap between a slit valve door and a sealing surface of a slit valve, such as a metallic insert. The film spacer can extend the life of a seal by limiting the line of sight exposure of the seal to corrosive gases within a wafer processing chamber, for example, and by controlling the compression percentage of the seal. The spacer may be located on an outer ambient side of the slit valve away from any corrosive gasses that may exist in the chamber.

Accordingly, a slit valve door or slit valve comprises a sealing face and a thin film spacer on the sealing face for maintaining a minimum gap between the sealing face and a corresponding sealing surface. A seal element on the sealing face can be provided for sealing against the corresponding sealing surface. The spacer can be located outwardly from the seal element on an ambient side thereof such that the spacer will not be exposed to corrosive gasses in the chamber and, therefore, is not generally subject to accelerated degradation by the same. By maintaining a minimum gap between the door and the slit valve, the spacer provides for consistent compression of the seal and, therefore, also can prevent overcompression of the seal and potential premature wear. The reduced minimum gap between the door and chamber achieved with the spacer results in decreased line of sight exposure of the seal to corrosive gasses in the chamber and, thus, seal life can be extended.

More particularly, the seal element and spacer can be formed as an integral piece, and the seal element and/or spacer can be continuous along the sealing face. The spacer can be formed of a material selected from the group consisting of elastomers and polymers, and can be a sprayed-on coating or can be bonded to the sealing surface. The sealing surface can be planar or multi-planer.

In accordance with another aspect, a slit valve assembly comprises a slit valve having a valve opening and a sealing surface surrounding the valve opening, and a slit valve door movable between open and closed positions to respectively permit and block flow through the valve opening of the slit valve. The slit valve door has a sealing face for sealing against the sealing surface of the slit valve. A thin film spacer is provided on at least one of the sealing face of the slit valve door and the sealing surface of the slit valve for maintaining a minimum gap between the sealing face and the sealing surface when the door is in a closed position.

The slit valve door can further include a seal element on the sealing face for sealing against the sealing surface of the slit valve. The spacer can be located outwardly from the seal element on an ambient side thereof, and the seal element and spacer can be formed as an integral piece. The seal element and/or spacer can be continuous along the sealing face. The spacer can be formed of a material selected from the group consisting of elastomers and polymers, can be a sprayed-on coating, or can be bonded to the sealing surface. The sealing surface can be planar or can be multi-planar.

In accordance with another aspect, a slit valve door comprises a multi-plane sealing face, and a seal element received in a groove in the sealing face for sealing against an opposed multi-plane sealing face of a slit valve. The sealing element has a portion thereof that protrudes from the groove beyond the surface of the sealing face to form a seal bead. The seal element can also include a second portion thereof that protrudes from the groove beyond the sealing face of the slit valve door, the second portion being spaced apart from the seal bead and configured to limit line-of sight exposure of the seal bead to corrosive gasses when the door is installed in a slit valve assembly and in a closed position. The seal element can be generally surrounded on three sides by the valve door. A thin film spacer can be provided for maintaining a minimum gap between the slit valve door and a corresponding sealing surface of a slit valve.

The foregoing and other features of the invention are more particularly described in the following detailed description when considered in conjunction with the drawings.

BRIEF DESCRIPTION OF THE DRAWINGS

In the annexed drawings:

FIG. 4 is a perspective view of a slit valve door;

FIG. 5 is a perspective view, partly shown in cross-section, of the slit valve door of FIG. 4;

DETAILED DESCRIPTION

Figure 1:
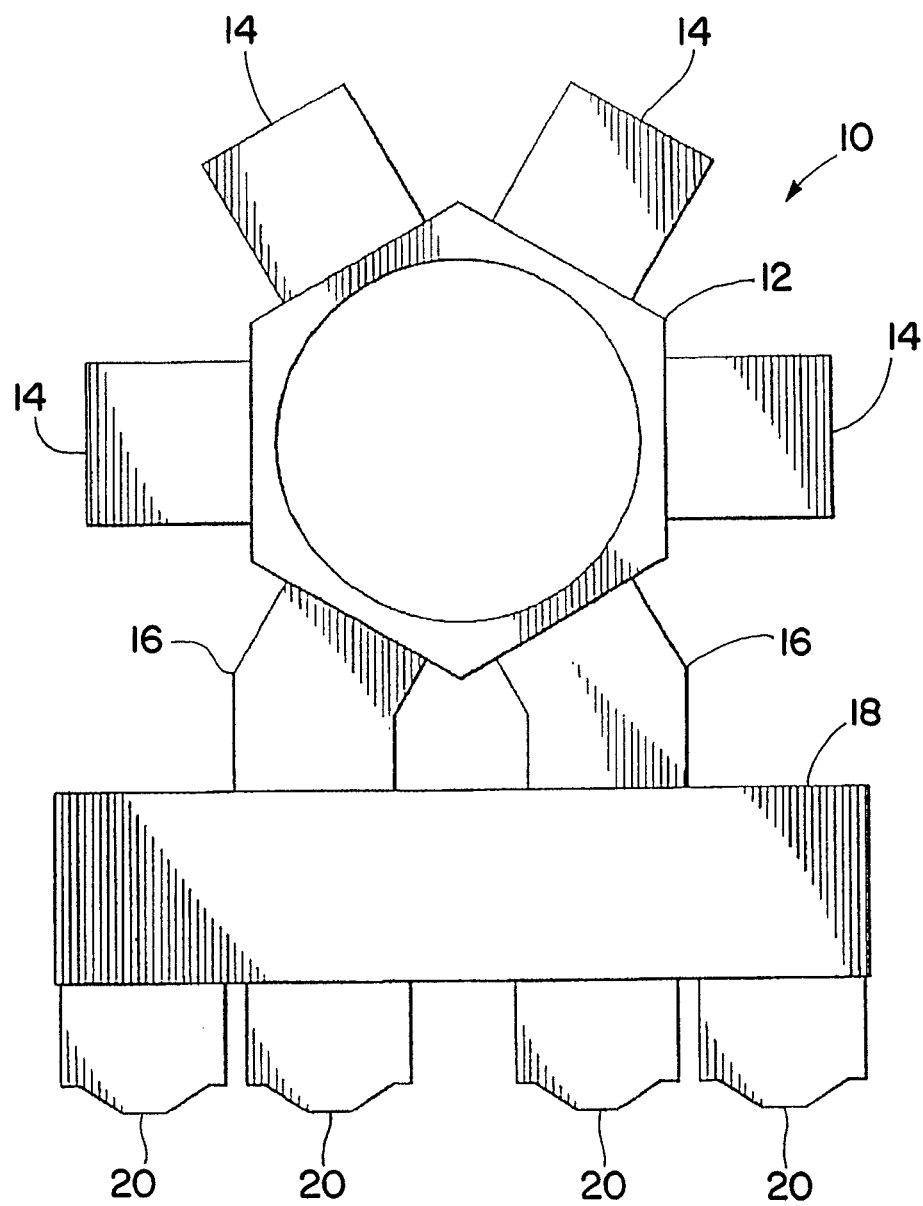
FIG. 1 is a top schematic view of a prior art vacuum system including a transfer chamber and a lid.

Referring now in detail to the drawings and initially to FIG. 1, an exemplary prior art vacuum processing system is generally indicated at 10. The system 10 comprises a series of vacuum chambers 14 attached to a central vacuum transfer chamber 12. A pair of vacuum load lock chambers 16 provide a passageway to a mini-environment 18. Pod loaders 20 are shown attached to the mini-environment 18. This system is an example of a cluster tool.

The vacuum chambers 14 may be connected to the transfer chamber 12 at an airtight seal which permits wafers to pass between the chambers 12, 14 and 16 without losing the vacuum in the chambers. The pod loaders 20 are attached to the mini-environment 18 and may be loaded with wafer cassettes (wafer holders) by a person or by an automated machine that is part of the over-all automated manufacturing system of the manufacturing plant or building that houses the vacuum processing system 10. A robot (not shown) within the mini-environment 18 may move the wafers or cassettes from the pod loaders 20 to the load lock chambers 16 and back again. A robot (not shown) with an arm and a blade for moving wafers within transfer chamber 12 may move the wafers from one of the load lock chambers 16 to the process chambers 14 and back to one of the load lock chambers 16.

The vacuum chambers 14 may be any of several types of process chambers, such as a chemical vapor deposition (CVD) chamber, a physical vapor deposition (PVD) chamber, an etch chamber, etc., for performing on a wafer some type of process in a series of many processes for manufacturing integrated circuits on wafers.

Figure 2:
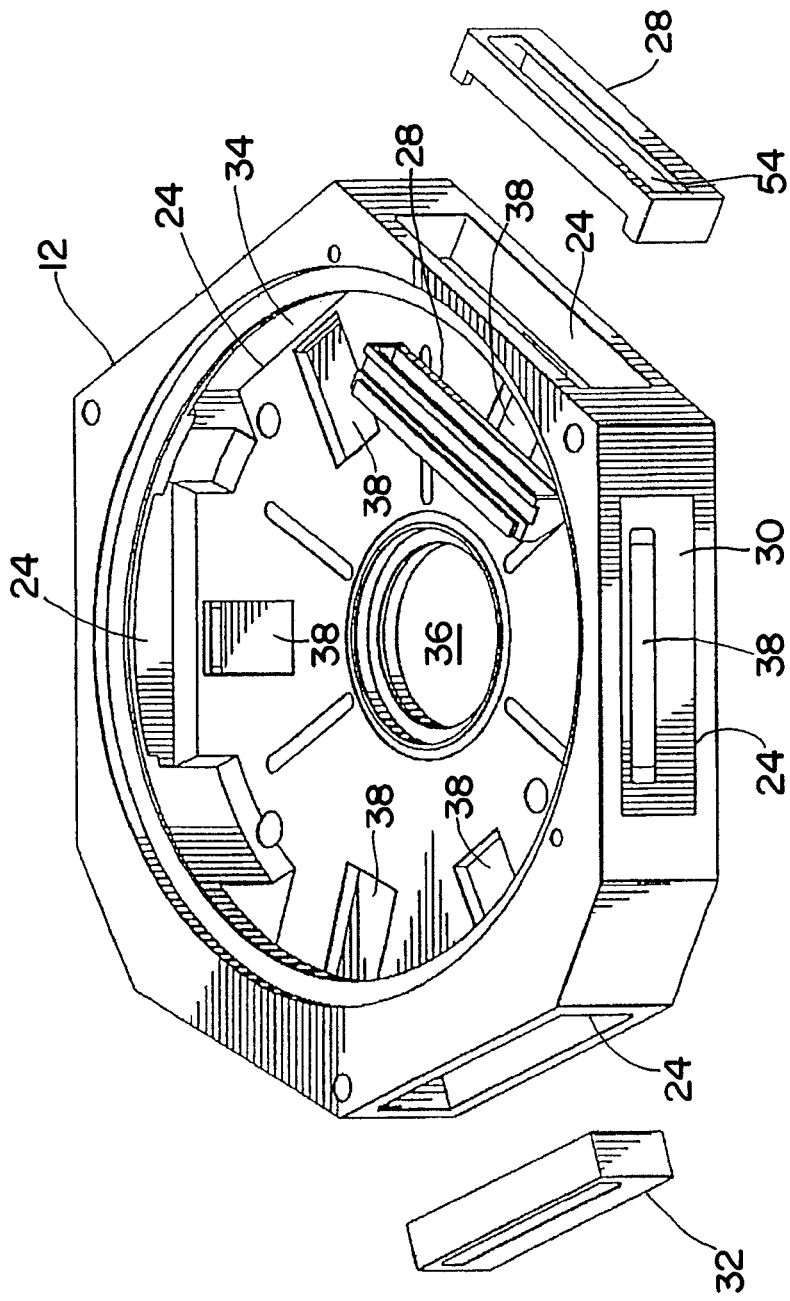
FIG. 2 is a perspective view of a transfer chamber with the lid off.
Figure 3:
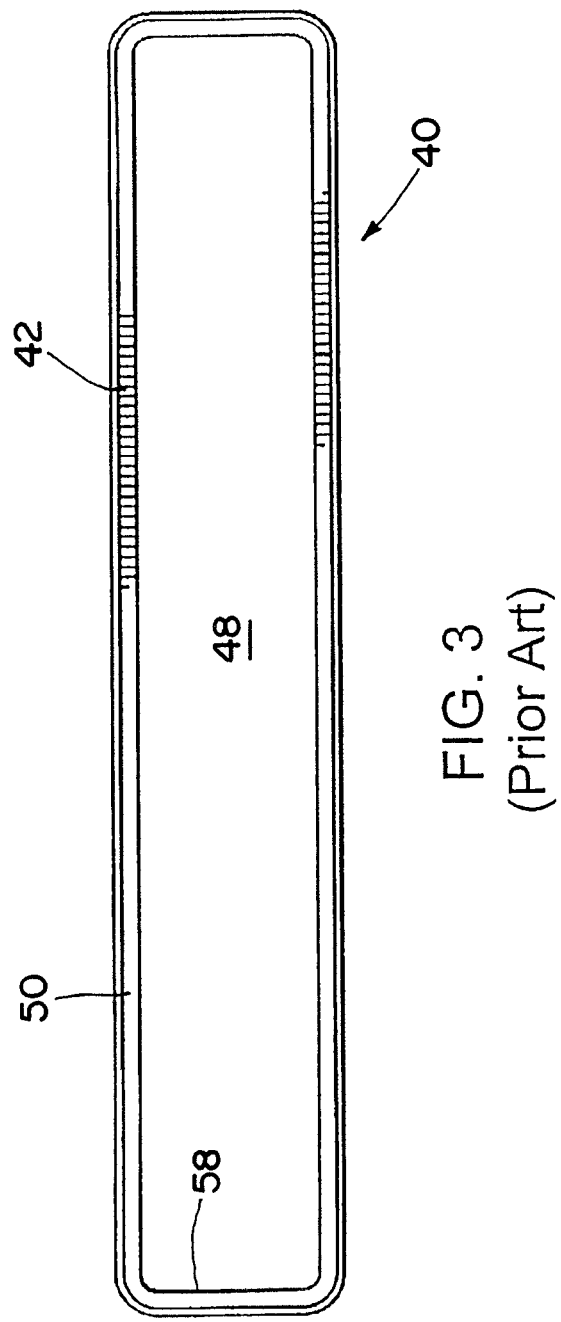
FIG. 3 is a plan view of the face of a seal plate.

In FIG. 2 the transfer chamber 12 is shown with its lid removed so that the interior of the transfer chamber 12 is visible. Several slit valves with openings 24 can be seen, as can slit valve inserts 28, 30, 32 and 34. Circular opening 36 supports a robot with an arm for moving wafers inside the transfer chamber 12, but the robot is not shown in this drawing so other details of the transfer chamber 12 may be visible. Openings 38 provide access for an actuating cylinder for manipulating a slit valve door, the face of which is shown in FIG. 3. The actuating cylinder and the slit valve door are not shown so that other features in the transfer chamber 12 may be visible. An example of a slit valve door and actuating cylinder is shown and described in U.S. Pat. No. 5,226,632, which is incorporated herein by reference.

FIG. 3 shows the front face plate of the slit valve door 40. On front face 48 of seal plate 42 is a molded-in-place seal 50 for contacting with a slit valve insert 28, 30, 32, 34, or a seat portion formed thereon. The molded-in-place seal 50 is molded into a groove 58 formed around the periphery of front face 48. The seal may be vulcanized to the seal plate 42. Thus, in the manufacturing of seal plate 42, the seal 50 may be permanently attached to the seal plate 42. The seal 50 may be adhesively bonded to the metal surface of groove 58.

This type of slit valve door 40 may be actuated in a direction perpendicular to the plane in which its front face 48 is held by an actuating cylinder that protrudes out of opening 38. The seal 50 may match angular face 54 of the inner portion of insert 28. The actuating cylinder protruding out of opening 38 pushes slit valve door 40 up against slit valve insert 28 such that the molded-in-place seal 50 engages surface 54 making an airtight seal all around opening 56. Thus, when slit valve opening 24 is closed by slit valve door 40, the pressure in either the transfer chamber 12 or the process chamber 14 may change as needed without leakage between the two chambers.

Referring now to FIGS. 4 and 5, a slit valve door is designated generally by reference numeral 64. The slit valve door 64 includes an annular seal 72 that preferably is molded into an annular groove 74 in the front face of the door. The molded-in-place seal 72 may have a bottom contour that matches the contour of the groove 74. As shown, the groove 74 may have upwardly curving edges or sides that end almost vertical, or perpendicular, to front face 70. The groove surface may have a suitable roughness to enhance the adhesion between the seal material and the groove.

The seal 72 may be made of any suitable material that preferably does not generate many, if any, particles under the dynamic loading experienced by the seal, such as a variety of fluorocarbon and perfluoro elastomers that suit the requirements of wafer processing. Suitable seal materials are well known in the art. The seal 72 may additionally or alternatively be bonded to the door 64 by use of a suitable bonding agent.

Figure 6:
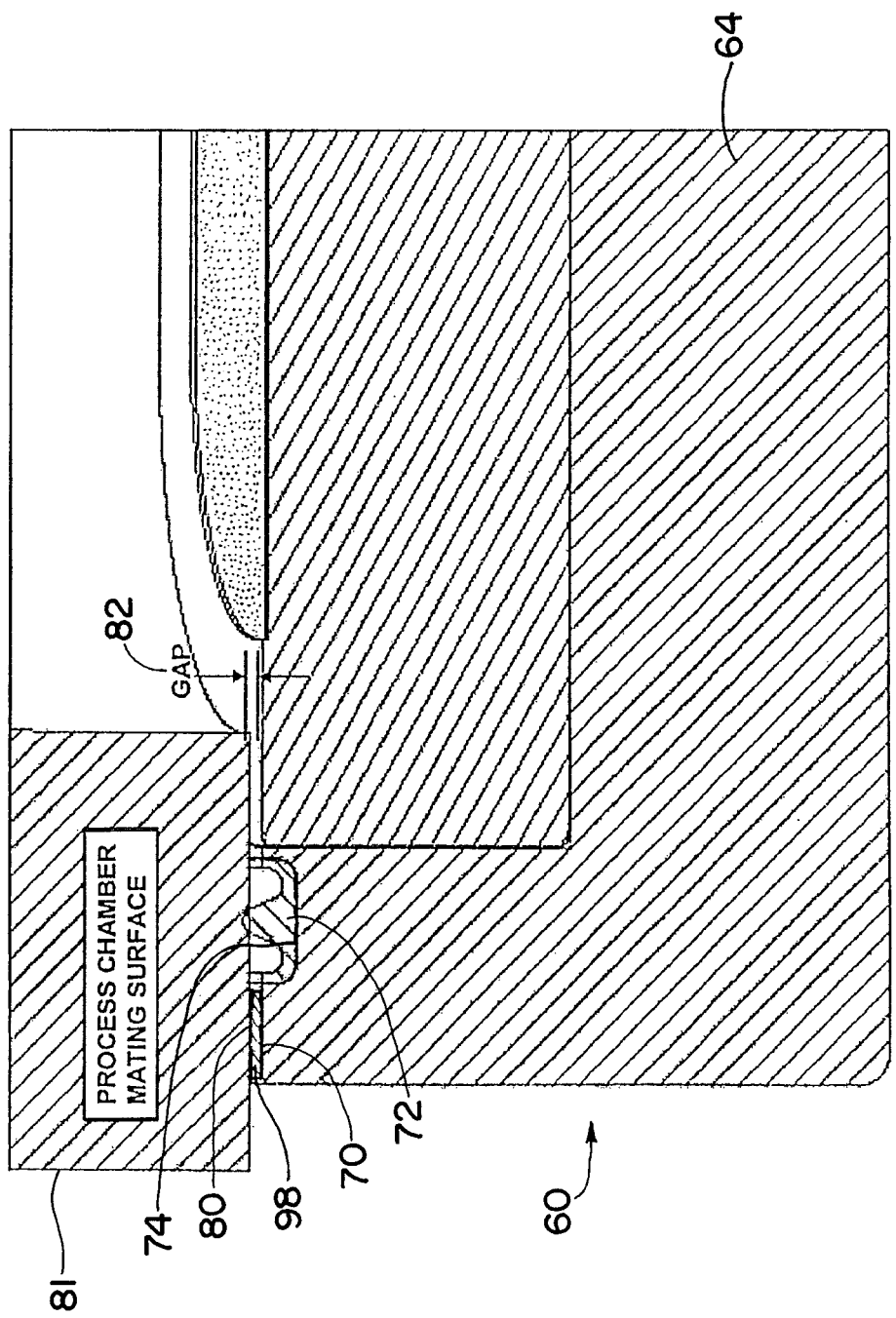
FIG. 6 is an enlarged cross-sectional view of a portion of a slit valve assembly including an exemplary slit valve door having a spacer in accordance with the invention shown in closed relationship to a mating sealing surface of the slit valve.

Turning to FIG. 6, which is a sectional view taken along the plane 62 in FIG. 4, a slit valve assembly 60 is illustrated including an exemplary slit valve door 64 having a thin film spacer or bumper 98 in accordance with the invention. The thin film spacer 98 is located between the sealing surface 70 of the slit valve door 64 and a sealing surface 80 of a slit valve 81 for maintaining a gap 82 therebetween. The thin film spacer 98 prevents the sealing surfaces 70 and 80 from contacting each other, and operates to maintain the minimum distance therebetween without the need to precisely calibrate the actuator and/or adjust the slit valve door 64 for such purpose. Thus, the actuator generally can be configured to apply a force adequate to compress the seal 72 a desired amount without the need to account for potentially overcompressing the seal 72.

The spacer 98 also allows a much smaller gap 82 to be achieved than would otherwise generally be possible. As will be appreciated, a smaller gap limits the line-of-sight exposure of the seal 72 to the corrosive gaseous flow within the chamber, which can extend the life of the seal 72.

The thin film spacer 98 can be positioned on either side or both sides of the seal 72. In the illustrated embodiment, the spacer 98 is on the outer ambient non-process side of the sealing 72, opposite the inner chamber process side. This position minimizes spacer material degradation due to exposure to the corrosive gasses of the chamber. The spacer 98 may or may not be attached to the slit valve door 64, but in general it will be firmly secured thereto to reduce mechanically-abraded particle generation under the spacer 98. Alternatively, the spacer 98 can be adhesively adhered, coated or sprayed, or chemically joined to the slit valve door 64.

It will be appreciated that the seal 72 may have the cross-sectional shape shown in FIG. 6. The seal 72, however, would normally be compressed between the opposed/mating sealing surface 80 of the slit valve 81 and the front face 70 of the door 64. Thus, the configuration would be different than that schematically depicted in FIG. 6. For instance, the seal may undergo compression as described in U.S. Pat. No. 6,089,543, which is hereby incorporated herein by reference.

The dimensions (e.g., width and thickness) of the spacer 98 can be designed to accept maximum application loads from differential pressure forces and worst-case CDA pressure settings. At such maximum application loads, the spacer 98 can be designed to yield virtually no deflection, allowing for consistent seal compression and gap control between the door 64 and the slit valve 81 regardless of the spacer material's fatigue strength and thermal stability throughout numerous dynamic cycles and high temperature softening.

In the compressed seal state, current slit valve door sealing elements typically yield a gap 82 of about 0.015" or greater. The thin film spacer 98 can be used to minimize the gap to several magnitudes smaller than 0.015". Such gap sizes are generally not possible with other types of spacers, such as spacer blocks, for example. The smaller gap 82 limits the volume of corrosive gases that may attack the seal 72 during the wafer processing cycle, which as mentioned can result in increased seal 72 life. Further, because the spacer 98 generally reduces or eliminates the extent to which the seal can be compressed, seal degradation do to overcompression can also be reduced or eliminated.

Figure 7:
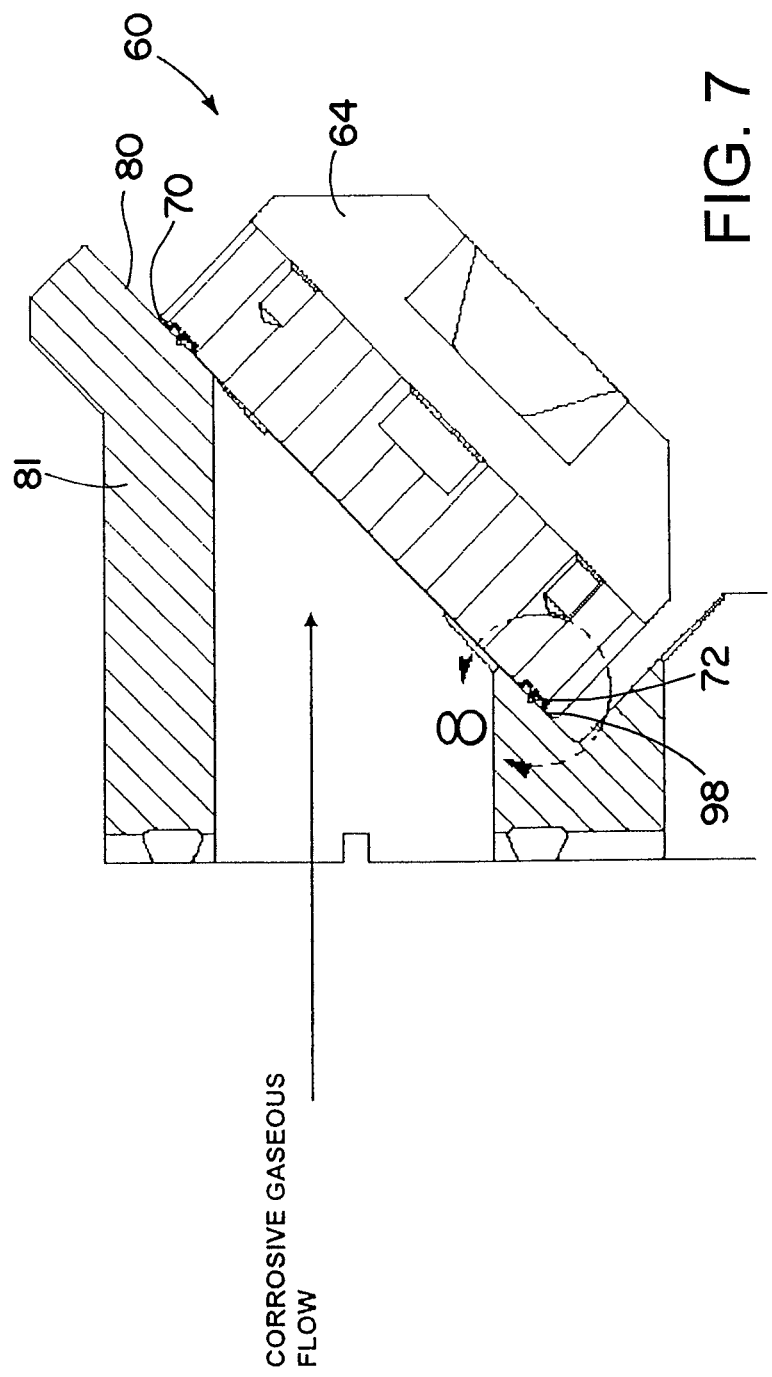
FIG. 7 is cross-sectional view of another exemplary slit valve assembly including a slit valve door having a spacer in accordance with the invention.
Figure 8:
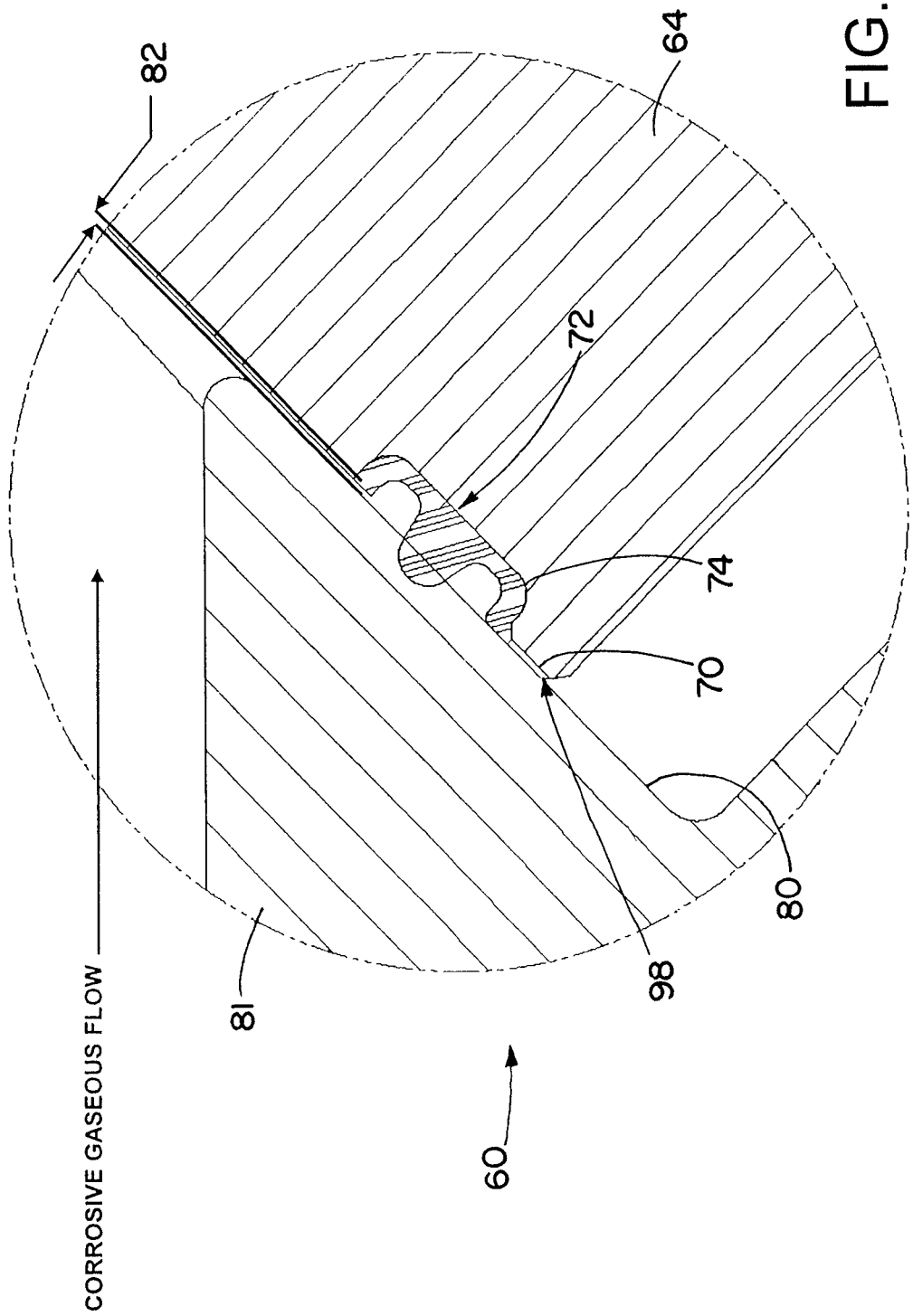
FIG. 8 is an enlarged portion of FIG. 7.
Figure 9:
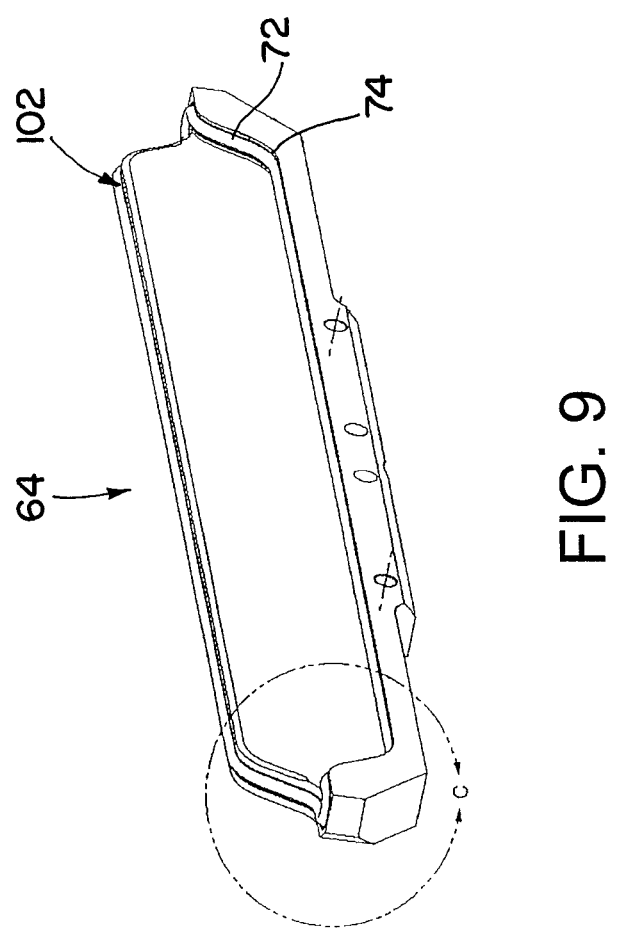
FIG. 9 is a perspective view of another exemplary slit valve door in accordance with the invention.
Figure 10:
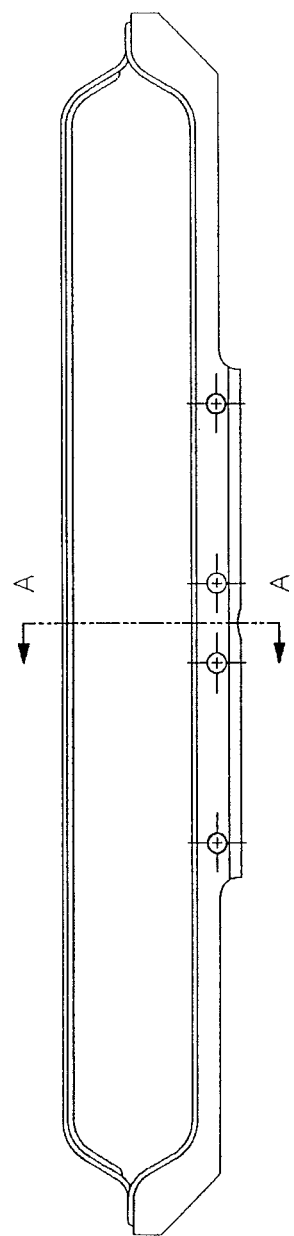
FIG. 10 is a front elevation view of the slit valve door of FIG. 9.
Figure 11:
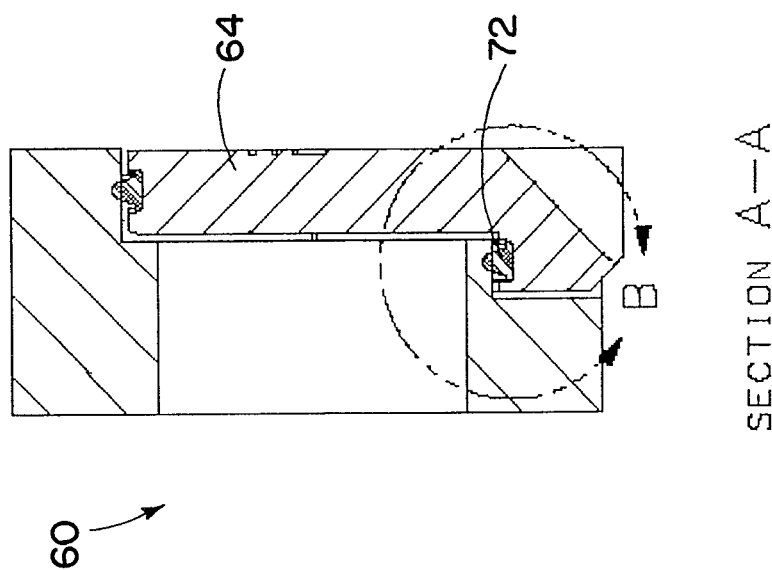
FIG. 11 is a cross-sectional view, taken along line A-A in FIG. 10, of the slit valve of FIGS. 9 and 10 in another exemplary slit valve.

Turning to FIGS. 7 and 8, another exemplary slit valve assembly 60 is illustrated including a slit valve door 64 in accordance with the invention. The slit valve assembly 60 is similar to the slit valve assembly shown and described in connection with FIG. 6. As such, the slit valve door 64 may be actuated in a direction perpendicular to the plane in which its front face 48 is held by an actuating cylinder, and the door 64 seals against an angled sealing face of the slit valve 81 (or insert). Spacer 98 maintains gap 82 between the slit valve door 64 and the slit valve 81 in the manner previously described.

Turning now to FIGS. 9-12, another exemplary slit valve assembly 60 is illustrated. The slit valve assembly 60 includes a slit valve door 64 having a multi-plane sealing face 102 for sealing against a corresponding sealing face 80 of the slit valve 81. The multi-plane sealing face 102 includes a seal 72 molded into an annular groove 74.

Figure 12:
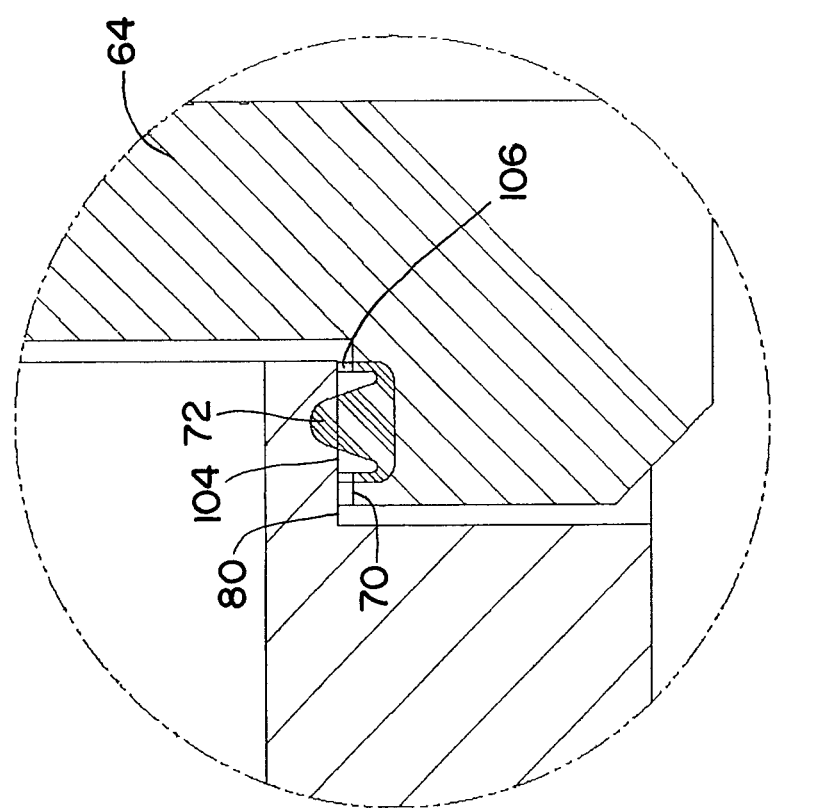
FIG. 12 is an enlarged portion of FIG. 11.

The seal 72 is similar to the seals shown and described above. In this embodiment, however, additional elastomeric material 106 adjacent the seal 72, best seen in FIG. 12, is provided for blocking exposure of the seal 72 to the corrosive chemicals in the chamber when the valve is closed. The seal 72 and barrier material 106 can be formed as a unitary piece as illustrated. The barrier elastomeric material 106 generally extends above sealing surface 80 of the door 64 and is provided on both the ambient and chamber sides of the seal 72, but may also be provided only on one side of the seal 72, such as the chamber side, for example.

The elastomeric material 106 on the chamber side typically can be subject to degradation due to exposure to the corrosive gasses of the chamber. As will be appreciated, however, since the elastomeric material 106 is generally non-functional with respect to performing a sealing function, any such degradation typically will not impact the ability of the slit valve door 64 to seal properly. Thus, by blocking exposure of the seal 72 to chemicals in the chamber, the barrier elastomeric material 106 can extend the life of the seal 72.

In addition, a spacer, such as spacer 98 shown and described above, can be provided on the multi-plane sealing face 102 adjacent the seal 72. Although not shown in this embodiment, the spacer would operate in a similar manner to maintain a minimum gap 82 between the sealing surfaces 70 and 80.

It will be appreciated that although the spacer 98 has been shown and described as attached to the slit valve door 64, it could also be provided on the slit valve sealing surface (e.g., insert) without departing from the scope of the invention. Further, aspects of the invention are can be applied to any type of slit valve as well as other valve types wherein maintaining a minimum gap between mating sealing surfaces is desired.

Further, the use of the term "ambient side" in the above description generally refers to the side of the seal opposite any corrosive gasses (e.g., the "process side"). Accordingly, the ambient side may be open to the atmosphere, or may be exposed to another chamber that contains gasses that are at least somewhat less corrosive than the gasses on the opposite side of the seal. In some applications there may not be an ambient side of the seal. This can be the case, for example, if both sides of the seal have corrosive gasses.

Although the invention has been shown and described with respect to a certain preferred embodiment or embodiments, it is obvious that equivalent alterations and modifications will occur to others skilled in the art upon the reading and understanding of this specification and the annexed drawings. In particular regard to the various functions performed by the above described elements (components, assemblies, devices, compositions, etc.), the terms (including a reference to a "means") used to describe such elements are intended to correspond, unless otherwise indicated, to any element which performs the specified function of the described element (i.e., that is functionally equivalent), even though not structurally equivalent to the disclosed structure which performs the function in the herein illustrated exemplary embodiment or embodiments of the invention. In addition, while a particular feature of the invention may have been described above with respect to only one or more of several illustrated embodiments, such feature may be combined with one or more other features of the other embodiments, as may be desired and advantageous for any given or particular application.

The invention claimed is:

1. A slit valve door or slit valve, comprising:
   a sealing face;
   a seal element on the sealing face for sealing against a corresponding sealing surface; and
   a thin film spacer on the sealing face for maintaining a minimum gap between the sealing face and the corresponding sealing surface, wherein the thin film spacer is located outwardly from the seal element with respect to a center of the slit valve door or slit valve on an ambient side thereof, wherein the thin film spacer has a central axis extending perpendicular to the sealing face, a cross-sectional length and a cross-sectional width each defined by respective continuous extents of material of the thin film spacer at respective cross-sections and each extending in a direction parallel to the sealing face and perpendicular to each other, the respective cross-sections being taken through the central axis and perpendicular to each other, the thin film spacer also having a thickness extending substantially perpendicular to the cross-sectional length and the cross-sectional width, the thickness being thin relative to both the cross-sectional length and the cross-sectional width.

2. A slit valve door or slit valve as set forth in claim 1, wherein the seal element and thin film spacer are formed as an integral piece.

3. A slit valve door or slit valve as set forth in claim 1, wherein the seal element is continuous along the sealing face.

4. A slit valve door or slit valve as set forth in any claim 1, wherein the thin film spacer is continuous along the sealing face.

5. A slit valve door or slit valve as set forth in claim 1, wherein the thin film spacer is formed of a material selected from a group consisting of elastomers and polymers.

6. A slit valve door or slit valve as set forth in claim 1, wherein the thin film spacer is a sprayed-on coating.

7. A slit valve door or slit valve as set forth in claim 1, wherein the thin film spacer is bonded to the sealing surface.

8. A slit valve door or slit valve as set forth in claim 1, wherein the sealing surface is a multi-plane sealing surface.

9. A slit valve door or slit valve as set forth in claim 1, further comprising a second spacer, each spacer having respective central axes.

10. A slit valve door or slit valve as set forth in claim 1, wherein the thin film spacer is annular.

11. A slit valve door or slit valve as set forth in claim 1, wherein the thin film spacer is linear.

12. A slit valve assembly comprising:
    a slit valve having a valve opening and a sealing surface surrounding the valve opening; and
    a slit valve door movable between open and closed positions to respectively permit and block flow through the valve opening of the slit valve, the slit valve door having a sealing face;
    a seal element on at least one of the sealing face or sealing surface for sealing against the other one of the sealing face or sealing surface; and
    a thin film spacer on at least one of the sealing face of the slit valve door or the sealing surface of the slit valve and located outwardly from the seal element with respect to a center of the slit valve door or slit valve on an ambient side thereof for maintaining a minimum gap between the sealing face and the sealing surface when the slit valve door is in a closed position, wherein the thin film spacer has a central axis extending perpendicular to the sealing face or sealing surface, a cross-sectional length and a cross-sectional width each defined by respective continuous extents of material of the spacer at respective cross-sections and each extending in a direction parallel to the sealing face and perpendicular to each other, the respective cross-sections being taken through the central axis and perpendicular to each other, the thin film spacer also having a thickness extending substantially perpendicular to the cross-sectional length and the cross-sectional width, the thickness being thin relative to both the cross-sectional length and the cross-sectional width.

13. A slit valve assembly as set forth in claim 12, wherein the seal element and spacer are formed as an integral piece.

14. A slit valve assembly as set forth in claim 12, wherein the seal element is continuous along the sealing face.

15. A slit valve assembly as set forth in claim 12, wherein the thin film spacer is continuous along the sealing face.

16. A slit valve assembly as set forth in claim 12, wherein the thin film spacer is formed of a material selected from the group consisting of elastomers and polymers.

17. A slit valve assembly as set forth in claim 12, wherein the thin film spacer is a sprayed-on coating.

18. A slit valve assembly as set forth in claim 12, wherein the thin film spacer is bonded to the sealing surface.

19. A slit valve assembly as set forth in claim 12, wherein the sealing face is multi-plane sealing face.

20. A slit valve assembly as set forth in claim 12, further comprising a second spacer, each spacer having respective central axes.

21. A slit valve assembly as set forth in claim 12, wherein the thin film spacer is annular.

22. A slit valve assembly as set forth in claim 12, wherein the thin film spacer is linear.

* * * * *